Nov. 11, 1947.  W. A. YOUNG  2,430,595
WIDE ANGLE OPTICAL SYSTEM
Filed July 13, 1944
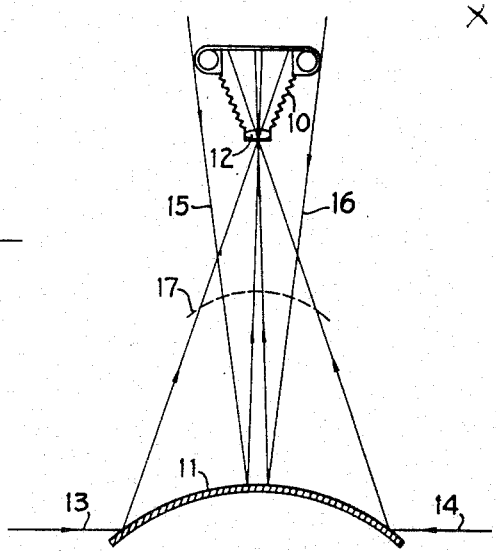
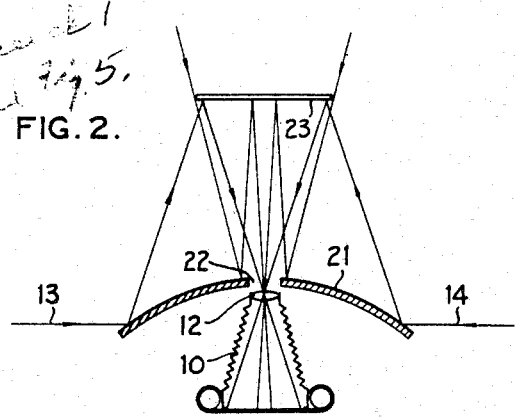
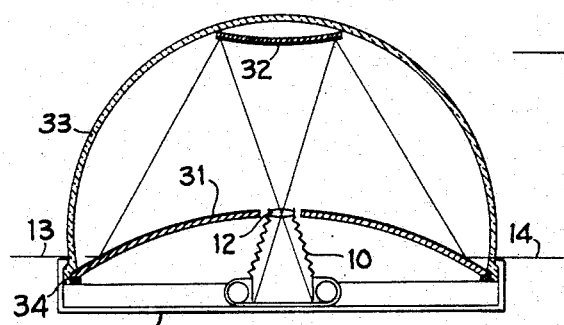
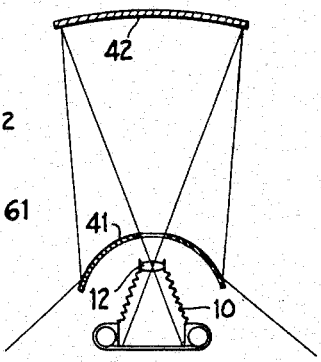
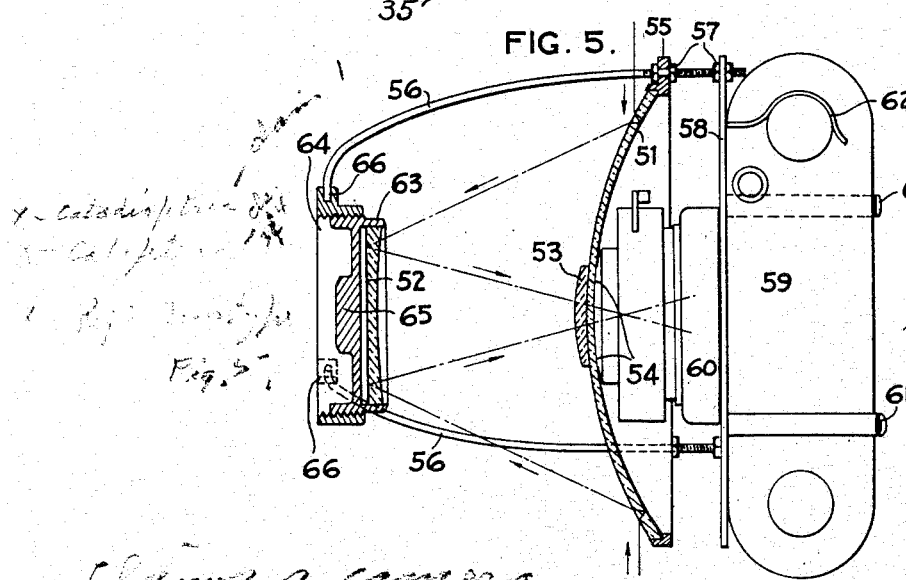
WILLIAM A. YOUNG
INVENTOR
ATT'Y & AGT Patented Nov. 11, 1947

2,430,595

UNITED STATES PATENT OFFICE 2,430,595

WIDE-ANGLE OPTICAL SYSTEM

William A. Young, Rochester, N. Y., assignor to Eastman Kodak Company, Rochester, N. Y., a corporation of New Jersey Application July 13, 1944, Serial No. 544,693

4 Claims. (Cl. 88—57)

This invention relates to extremely wide-angle lens and mirror systems capable of covering a field of approximately a hemisphere or more.

It is known to photograph approximately a hemisphere by aiming a camera at a reflecting sphere. Recently such systems have been used for making a record of the whole sky except for the blind spot caused by the body of the camera and its support. A similar system, designed for a special purpose and using an aspherical reflector, has been described in the Journal of the Optical Society of America, vol. 33, pages 440–443.

The object of the present invention is to provide greater compactness, simplicity of operation and improved optical quality.

The present invention gains these advantages by placing a second reflector to face the first one and placing the camera inside the first reflector where it photographs the second reflector through an opening in the first.

Camera systems according to the present invention are easier to use since the shutter is most easily operated while standing behind the camera, and a person can be in that location without cutting off the field of view as would be the case in the older systems. Furthermore, the astigmatism can be reduced by dividing the dioptric power between two mirrors, and hence, a fairly sharp image can be obtained over a wider angle of field.

The opening in the first mirror may be a spot of unsilvered glass or it may be a hole cut through the material. In the latter case the camera lens may protrude through the hole.

In the accompanying drawing:

Fig. 1 shows an example of prior art.

Figs. 2, 3, and 4 show optical systems according to the invention with the second reflector plane, convex, and concave, respectively.

Fig. 5 shows a camera attachment according to the invention.

In Fig. 1 the camera 10 including lens 12 and the convex reflector 11 are arranged so that the camera photographs the image in the mirror of visible objects within the 180° angle from ray 13 to ray 14, except for the "blind spot" blocked off by the camera itself between the two rays 15 and 16, which graze the camera body.

In Fig. 2 on the other hand, the camera 10 is arranged inside the mirror 21 with the lens 12 pointed through an opening 22 in the center thereof. A plane mirror 23 is positioned midway between the former camera position and the new, reflecting the light rays to the new camera position without changing their abberrations. The greater compactness is quite evident. The only way of gaining compactness in the prior art was by using a more strongly curved reflector such as indicated in Figure 1 by the broken line 17, and thus introducing worse aberrations.

Fig. 3 shows an embodiment of the invention which is highly preferred because in it the blind spot at the axis is small and the aberrations are well corrected. This system consists of two convex mirrors 31 and 32 so that for the same angular coverage the blind spot is smaller than that shown in Fig. 2, while a reduction of the astigmatism is gained by dividing the dioptric power between the two reflectors. That is, the mirror 31 is flatter than the mirror 21 of Fig. 2. The two reflectors are rigidly supported by a transparent dome 33 of plastic material, the larger convex reflector being joined to the dome at the edges and the second reflector being cemented inside the dome at its center or being molded as an integral part of the dome. A satisfactory way of joining the large convex reflector is by molding the dome with a portion cut away from its inner edge forming a recess into which the mirror will fit, by pushing the mirror into this recess, and by putting in a retaining ring 34 after the mirror. The retaining ring may be threaded or it may be cemented directly to the plastic dome. A support 35 holding the dome with the mirrors in suitable alignment with the positive lens 12 makes the optical system complete. In particular, if the lens 12 is the lens of a camera 10, the system may be used for taking pictures.

The systems shown in Figures 1, 2, and 3 are all shown as covering an angular field of 90° from the axis, that is a whole hemisphere. This angle was chosen by way of example and to facilitate comparison of the several optical systems. Obviously, by increasing or decreasing the spacings between the camera and the mirrors or between the two mirrors the angle covered can be increased or decreased.

Fig. 4 shows an arrangement which is useful when it is important to cover a larger angle. In it the mirror 42 is concave and the mirror 41 is more highly convex than in the more preferred embodiments shown in Figs. 2 and 3.

Fig. 5 shows a schematic side view reduced in size and partly in cross-section of a camera attachment according to the invention. This attachment is designed to make 90° from the axis in the object space correspond to 20° from the axis in the image space inside the camera.

The optical elements of the attachment consist of a convex reflector 51, a second reflector 52, and a lens element 53. The convex reflector is back silvered with a central portion 54 about 25 mm. in diameter left unsilvered. The thickness of the glass is about 3 mm. and the radii of curvature of the front and back surfaces are respectively 115 mm. and 112 mm. The type of glass is of no great importance; either borosilicate crown or ordinary crown is suitable, or a transparent plastic may be used. The second reflector 52 has weaker dioptric power than the convex reflector 51, and of the same sign. A convex front silvered reflector with a radius of curvature of about 900 mm. would serve in this position. However, a back silvered reflector with a plano back surface and a concave front surface whose index of refraction is 1.516 and whose radius of curvature is about 462 mm. is preferable as shown, partly because of the better weathering properties of the back silvering and partly because of the better correction of aberrations obtained by the lens element having a negative Petzval contribution as compared with the reflector which would add a further positive Petzval contribution to that of the first convex reflector.

The two reflectors form a virtual image only a few inches in front of the camera. Accordingly the positive lens element 53 is added and acts as a portrait attachment enabling the camera to photograph the virtual image which is formed by the mirrors and which acts as an object for the camera. The thickness of the lens element is about 3 mm. and the radii of curvature of its surfaces are about 45 and 115 mm. respectively. A convenient method of mounting this lens element is by cementing it onto the front of the convex reflector and centering it over the unsilvered central portion of the latter. The lens element and the convex reflector could also be molded as an integral unit out of glass or a transparent plastic material.

The diameter of the convex reflector 51 is about 140 mm., that of the second reflector 52 is about 70 mm., and that of the lens element is about 26 mm.

The convex reflector is mounted in a ring 55 which has an L-shaped cross-section around most of the circumference. At three points (or more) it has lugs through which pass the small supporting rods 56 which are threaded to take retaining nuts 57. The lugs on the ring 55 are held between two nuts on each rod and a base plate 58 is spaced about 15 mm. away and similarly held. The base plate fits against the front of the body of the camera 59 and is located properly thereon by having a central opening cut out to fit the base 60 of the shutter mechanism housing. Alternatively it could be located by projections fitting over the body of the camera. The base plate holding the attachment is fastened to the camera body by four clamps 61, at least three of which are spring clips pressing against the back of the camera. The fourth is more conveniently fastened onto the film winding knob 62. An alternative arrangement using screw clamps would be more positive acting but would not be so convenient to use.

The second reflector 52 is spun into a mounting ring 63 which is threaded into an outer ring 64 and is provided with a knob or handle 65 on the back by which it may be turned to adjust the spacing of the two reflectors in order to change the angular field covered. The outer ring is provided with knobs or lugs 66 with holes threaded to take the ends of the supporting rods 56.

In assembling the attachment, the rods 56 are first screwed into the holes in the lugs 66 of the outer ring 64 and then passed through the holes in the lugs of the first-mentioned ring 55. The nuts are adjusted and tightened so as to hold the two mirrors substantially coaxial and with the distance from the front surface of the lens element 53 to the front surface of the second reflector 52 equal to about 69 mm.

The base plate having been provided with holes to take the supporting rods, the rods are inserted into these holes and the nuts adjusted so as to make the attachment substantially coaxial with the camera when affixed thereto and positioned with the rear surface of the convex reflector at or about 22 mm. in front of the entrance pupil of the lens. For example in a standard 35 mm. camera this would be about 6 mm. in front of the lens mount.

The attachment can then be fastened to the camera, the camera lens stopped down, and pictures taken of about a hemisphere. By focusing in the usual way, it may be found that the lens can be operated at a large aperture if it is first focused for a near object distance such as six feet instead of for infinity before putting on the attachment.

In all of the examples shown the actual curves used may vary within wide limits and may be either spherical or aspherical surfaces of revolution. For use with ordinary cameras, the most useful range of curves is that in which the convex reflector has a radius of curvature between 4 and 30 centimeters or equivalent dioptric power, that is, between about 7 and 50 diopters. If aspheric, this curvature is designated as being measured in an axial plane and at the margin of the central opening. Furthermore it is preferable that the second reflector have numerically smaller dioptric power than the first, but even this restriction is not absolutely necessary to successful operation. The distortion may be adjusted to some extent by the use of aspherical curves, but obviously a hemisphere cannot be copied onto a flat surface without some distortion, a fact well known in cartography.

What I claim is:

1. An image-forming optical system comprising a convex reflector which receives light from a distant object field and which has a central opening, a second reflector in front of the first which receives light from the first and reflects it to the central opening, a positive lens positioned approximately at the opening which receives said light and forms an image of the distant object field behind the first reflector, and a rigid support which holds the two reflectors and the lens in axial alignment and in the above-described relationship to one another, the dioptric power of the second reflector being numerically less than that of the positive lens and its diameter being less than the arcuate diameter of the first reflector.

2. In combination, a camera, two reflectors, and a rigid support, the camera being of the type having a lens of positive power and means for locating an image plane, the two reflectors consisting of coaxial surfaces of revolution of which the first reflector is convex and is provided with a central opening and the second reflector faces the first and has a numerically smaller dioptric power, the rigid support holding the two reflectors so that the first reflector has its central opening near the positive lens and its back toward the image plane and the support having transparent portions permitting light from a large field of view to strike the first and then the second reflector and then to pass through the positive lens and the opening in the first reflector and form an image at the image plane.

3. A camera attachment comprising a convex reflector for receiving light from a large field of view and provided with a central opening, a second reflector facing, and having smaller dioptric power than, the convex reflector for receiving light from the convex reflector and for reflecting it into the central opening therein, a rigid support for holding the two reflectors in axial alignment, and means for fastening the attachment onto a camera with the back of the convex reflector toward the body of the camera and with the center of the opening therein substantially at the front of the lens of the camera.

4. A camera attachment according to claim 3 in which the radius of curvature of the convex reflector as measured at the margin of the central opening and in an axial plane is between 4 and 30 centimeters.

WILLIAM A. YOUNG.

REFERENCES CITED

The following references are of record in the file of this patent:

UNITED STATES PATENTS

| Number | Name | Date |
| --- | --- | --- |
| 2,297,345 | Bowen | Sept. 29, 1942 |
| 1,578,899 | Lohmann | Mar. 30, 1926 |
| 1,983,108 | Verdich | Dec. 4, 1934 |
| 1,157,154 | De Falco | Oct. 19, 1915 |
| 2,244,235 | Ayres | June 3, 1941 |
| 1,967,214 | Acht | July 24, 1934 |

FOREIGN PATENTS

| Number | Country | Date |
| --- | --- | --- |
| 82,671 | Germany | Aug. 7, 1895 |
| 819,827 | France | July 19, 1937 |